US007661413B2

(12) United States Patent
Sato et al.

(10) Patent No.: US 7,661,413 B2

(45) Date of Patent: Feb. 16, 2010

(54) FUEL SUPPLY PUMP AND TAPPET STRUCTURE BODY

(75) Inventors: Sakae Sato, Saitama (JP); Nobuo Aoki, Saitama (JP); Misao Tanabe, Saitama (JP); Tsutomu Miyazaki, Saitama (JP)

(73) Assignee: Bosch Corporation, Tokyo (JP)

( * ) Notice: Subject to any disclaimer, the term of this patent is extended or adjusted under 35 U.S.C. 154(b) by 166 days.

(21) Appl. No.: 11/912,725

(22) PCT Filed: Sep. 15, 2005

(86) PCT No.: PCT/JP2005/017011

§ 371 (c)(1), (2), (4) Date: Oct. 26, 2007

(87) PCT Pub. No.: WO2006/131999

PCT Pub. Date: Dec. 14, 2006

(65) Prior Publication Data

US 2009/0071446 A1 Mar. 19, 2009

(30) Foreign Application Priority Data

Jun. 8, 2005 (JP) ............................ 2005-167692

(51) Int. Cl.
*F02M 37/04* (2006.01)
*F16H 53/06* (2006.01)

(52) U.S. Cl. ...................... 123/495; 123/90.48; 74/569

(58) Field of Classification Search ................. 123/508, 123/509, 90.48; 74/569

See application file for complete search history.

(56) References Cited

U.S. PATENT DOCUMENTS 1,912,367 A * 6/1933 Hesselman .................. 123/501
3,668,945 A * 6/1972 Hofmann ..................... 74/569
3,989,022 A * 11/1976 Pfister ........................ 123/500
4,430,977 A * 2/1984 Shimada ..................... 123/449
4,782,807 A * 11/1988 Takahashi ................... 123/506
4,829,646 A * 5/1989 Cigolotti et al. ......... 29/888.01
4,840,161 A * 6/1989 Eckell et al. ................ 123/500
5,007,401 A * 4/1991 Grohn et al. ................ 123/509
5,193,510 A * 3/1993 Straubel ..................... 123/502
5,307,778 A * 5/1994 Hummel et al. ............. 123/495
5,419,298 A * 5/1995 Nolte et al. ................. 123/508
5,979,416 A * 11/1999 Berger ........................ 123/509
6,350,107 B1 2/2002 Hamutcu
7,311,087 B2 * 12/2007 Shaull et al. ................ 123/509
7,509,947 B2 * 3/2009 Tansug et al. ............... 123/500
2002/0189438 A1 12/2002 Furuta (Continued)

FOREIGN PATENT DOCUMENTS

JP 56-150863 11/1981

(Continued)

*Primary Examiner*—Thomas N Moulis
(74) *Attorney, Agent, or Firm*—Ronald E. Greigg

(57) ABSTRACT

Disclosed is a fuel supply pump including a tappet structure body having a roller that contacts a cam and a tappet body disposed with a roller housing portion in which the roller is housed, with a pressure adjusting member for dispersing load force being interposed between the tappet body and a plunger. The pressure adjusting member includes a concave portion in a center portion of a surface that faces the tappet body and contacts the tappet body at the peripheral portion of the concave portion.

14 Claims, 17 Drawing Sheets

U.S. PATENT DOCUMENTS

| | | | | |
|---|---|---|---|---|
| 2003/0222154 | A1 | 12/2003 | Onishi et al. | |
| 2004/0156733 | A1 | 8/2004 | Spinnler | |
| 2007/0217926 | A1 * | 9/2007 | Tansug | 417/289 |

FOREIGN PATENT DOCUMENTS

| | | | |
|---|---|---|---|
| JP | 5-332222 | A | 12/1993 |
| JP | 2001-317430 | A | 11/2001 |
| JP | 2002-510015 | A | 4/2002 |
| JP | 2003-74439 | A | 3/2003 |
| JP | 2003-184699 | A | 7/2003 |
| JP | 2003-343390 | A | 12/2003 |
| JP | 2004-537005 | A | 12/2004 |

* cited by examiner (a)

(b)

(c)

(a)

(b)

(c)

(a)

(b)

(a)

(b)

(a)

(b)

FUEL SUPPLY PUMP AND TAPPET STRUCTURE BODY

CROSS-REFERENCE TO RELATED APPLICATION

This application is a 35 USC 371 application of PCT/JP2005/017011 filed on Sep. 15, 2005.

BACKGROUND OF THE INVENTION

1. Field of the Invention

The present invention relates to a fuel supply pump and a tappet structure body, and more particularly to a tappet structure body that includes a roller and a tappet body and is disposed so as to be interposed between a plunger and a cam, and to a fuel supply pump disposed with that tappet structure body.

2. Description of the Prior Art

Conventionally, various kinds of pressure-accumulating fuel injection devices that use a pressure accumulator (common rail) to efficiently inject high-pressure fuel in diesel engines and the like have been proposed.

As a fuel supply pump used in such pressure-accumulating fuel injection devices, a fuel supply pump has been employed which includes, for example, a cam integrated with a cam shaft that is rotated by the driving of the engine to be supplied with fuel, a plunger that is raised and lowered by of the rotation of the cam, a tappet structure body that transmits the rotation of the cam as raising force to the plunger, and a spring for applying lowering force to the tappet structure body and the plunger. Further, as the tappet structure body used in such a fuel injection pump, a tappet structure body has been proposed which is configured by a tappet body including a roller housing portion disposed with a sliding surface and by a roller that is held by a pin such that the roller may freely rotate and is housed in the roller housing portion of the tappet body, as shown in JP-A-2001-317430.

However, the tappet structure body disclosed in JP-A-2001-317430 is disposed with a projecting portion in the center portion of the upper surface of the tappet body at the place where it contacts the plunger and has a structure where, when the tappet structure body is raised and lowered, the pressing force loaded from the plunger becomes concentrated in the center portion of the tappet body. For that reason, there have been instances where, at the sliding surface of the roller housing portion of the tappet body, the pressure applied between the housed roller and the sliding surface on which it slides becomes non-uniform and damage occurs at the highest portion of the sliding surface. Consequently, instances have been observed where the durability of the tappet structure body becomes low and where, particularly when used in a fuel supply pump of a pressure-amplifying pressure-accumulating fuel injection device, its lifespan drops.

SUMMARY AND ADVANTAGES OF THE INVENTION

Thus, as a result of thorough investigation, the inventors of the present invention have discovered that the above problem can be prevented by allowing the pressing force loaded from the plunger to be dispersed to the peripheral portion of the tappet body.

That is, it is an object of the present invention to provide a fuel supply pump, and a tappet structure body suited for the fuel supply pump, that prevents damage to the sliding surface of the roller housing portion of the tappet body and is capable of stably supplying fuel even when the fuel supply pump is operated at a high pressure and a high speed over a long period of time particularly in order to accommodate a pressure-amplifying pressure-accumulating fuel injection device.

According to the present invention, there is provided a fuel supply pump comprising: a plunger for pressurizing fuel; a cam disposed below the plunger; a tappet structure body that is disposed between the cam and the plunger and is for transmitting rotational force of the cam as raising force to the plunger; and a spring for applying lowering force to the plunger, wherein the tappet structure body includes a spring seat that contacts an end portion of the spring, a roller that contacts the cam, and a tappet body disposed with a roller housing portion in which the roller is housed, and a pressure adjusting member for dispersing load force is interposed between the tappet body and the plunger, and the aforementioned problem can be solved.

That is, the pressing force loaded from the plunger can be dispersed to the peripheral portion of the tappet body by disposing the predetermined pressure adjusting member in the tappet body upper surface, so the pressure between the roller and the sliding surface of the roller housing portion can be prevented from becoming concentrated in one portion of the sliding surface. Consequently, even when the pump is operated at a high pressure and a high speed, damage to the sliding surface of the roller housing portion can be prevented and the durability can be dramatically improved.

Further, when configuring the fuel supply pump of the present invention, it is preferable for the pressure adjusting member to include a concave portion in a center portion of a surface that faces the tappet body and contact the tappet body at a peripheral portion of the concave portion.

Further, when configuring the fuel supply pump of the present invention, it is preferable for the outer shape of the pressure adjusting member to be a circular flat plate shape.

Further, when configuring the fuel supply pump of the present invention, it is preferable for the diameter of the pressure adjusting member to be larger than the diameter of a distal end portion of the plunger.

Further, when configuring the fuel supply pump of the present invention, it is preferable for the shape of the concave portion to be a circular shape having a predetermined depth and for the diameter of the concave portion to be larger than the diameter of the distal end portion of the plunger.

Further, when configuring the fuel supply pump of the present invention, it is preferable for a contact surface of the pressure adjusting member that contacts the plunger to be a flat surface.

Further, when configuring the fuel supply pump of the present invention, it is preferable for respective corner portions of the pressure adjusting member to be chamfered.

Further, when configuring the fuel supply pump of the present invention, it is preferable for the position of the pressure adjusting member to be fixed by covering the pressure adjusting member with the spring seat.

Further, when configuring the fuel supply pump of the present invention, it is preferable for the pressure adjusting member to comprise bearing steel.

Further, another aspect of the present invention is a fuel supply pump comprising: a plunger for pressurizing fuel a cam disposed below the plunger; a tappet structure body that is disposed between the earn and the plunger and is for transmitting rotational force of the cam as raising force to the plunger; a spring for applying lowering force to the plunger and a spring seat that contacts an end portion of the spring, wherein the tappet structure body includes the spring seat that contacts an end portion of the spring, a roller that contacts the cam, and a tappet body disposed with a roller housing portion in which the roller is housed, and the tappet body is disposed with one of either a concave portion formed in a center portion of an upper surface of the tappet body and a void formed in the inside of the tappet body in order to allow pressing force from the plunger when the tappet structure body rises or falls to be dispersed to a peripheral portion of the tappet body.

Further, when configuring the fuel supply pump of the present invention, it is preferable for the fuel supply pump to further comprise a mount member placed on the tappet body when the concave portion is formed.

Further, when configuring the fuel supply pump of the present invention, it is preferable for a contact surface of the tappet body or the mount member that contacts the plunger to be a flat surface.

Further, yet another aspect of the present invention is a tappet structure body that is used in a fuel supply pump and includes a roller, a tappet body disposed with a roller housing portion in which the roller is housed, and a pressure adjusting member placed on an upper surface of the tappet body, wherein the pressure adjusting member includes a concave portion in a center portion of a surface that faces the tappet body and contacts the tappet body at a peripheral portion of the concave portion.

Further, yet another aspect of the present invention is a tappet structure that is used in a fuel supply pump and includes a roller and a tappet body disposed with a roller housing portion in which the roller is housed, wherein the tappet body is disposed with at least one of a concave portion formed in a center portion of an upper surface of the tappet body and a void formed in the inside of the tappet body in order to allow pressing force loaded to the tappet body when the tappet structure body rises or falls to be dispersed to a peripheral portion of the tappet body.

BRIEF DESCRIPTION OF THE DRAWINGS

Other objects and advantages of the invention will become apparent from the description contained herein below, taken with the drawings, in which.

DESCRIPTION OF THE PREFERRED EMBODIMENTS

A first embodiment of the present invention includes a fuel supply pump including: a plunger for pressurizing fuel; a cam disposed below the plunger; a tappet structure body that is disposed between the cam and the plunger and is for transmitting the rotational force of the cam as raising force to the plunger; a spring for applying lowering force to the plunger; and a spring seat that contacts an end portion of the spring.

The fuel supply pump is characterized in that the tappet structure body includes a roller that contacts the cam and a tappet body that includes a roller housing portion in which the roller is housed, with a pressure adjusting member for dispersing load force being interposed between the tappet body and the plunger.

Below, the fuel supply pump will be separated into its configural requirements and specifically described.

Figure 1:
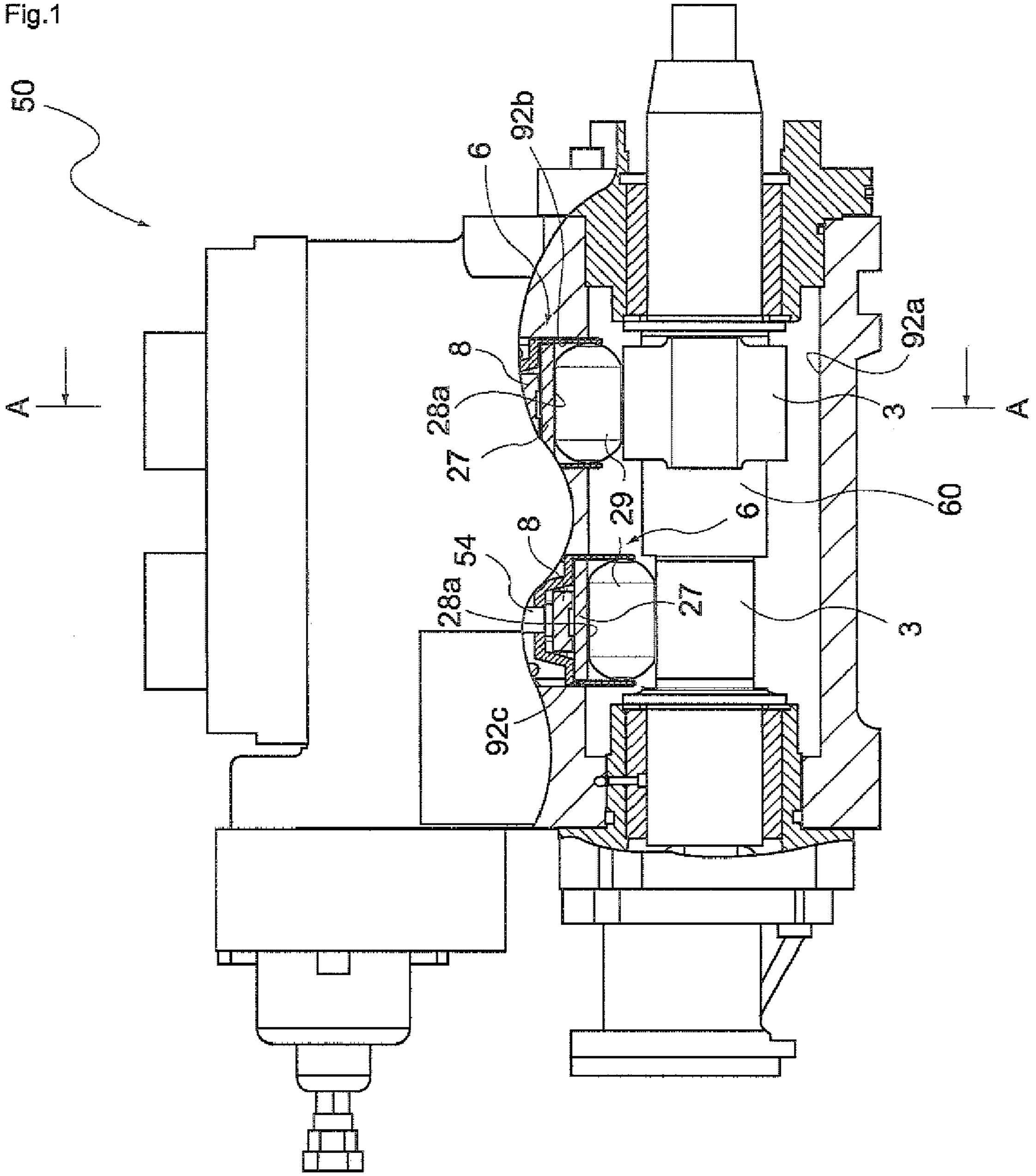
FIG. 1 is a side diagram including a partial cutaway of a fuel supply pump of the present invention.
Figure 2:
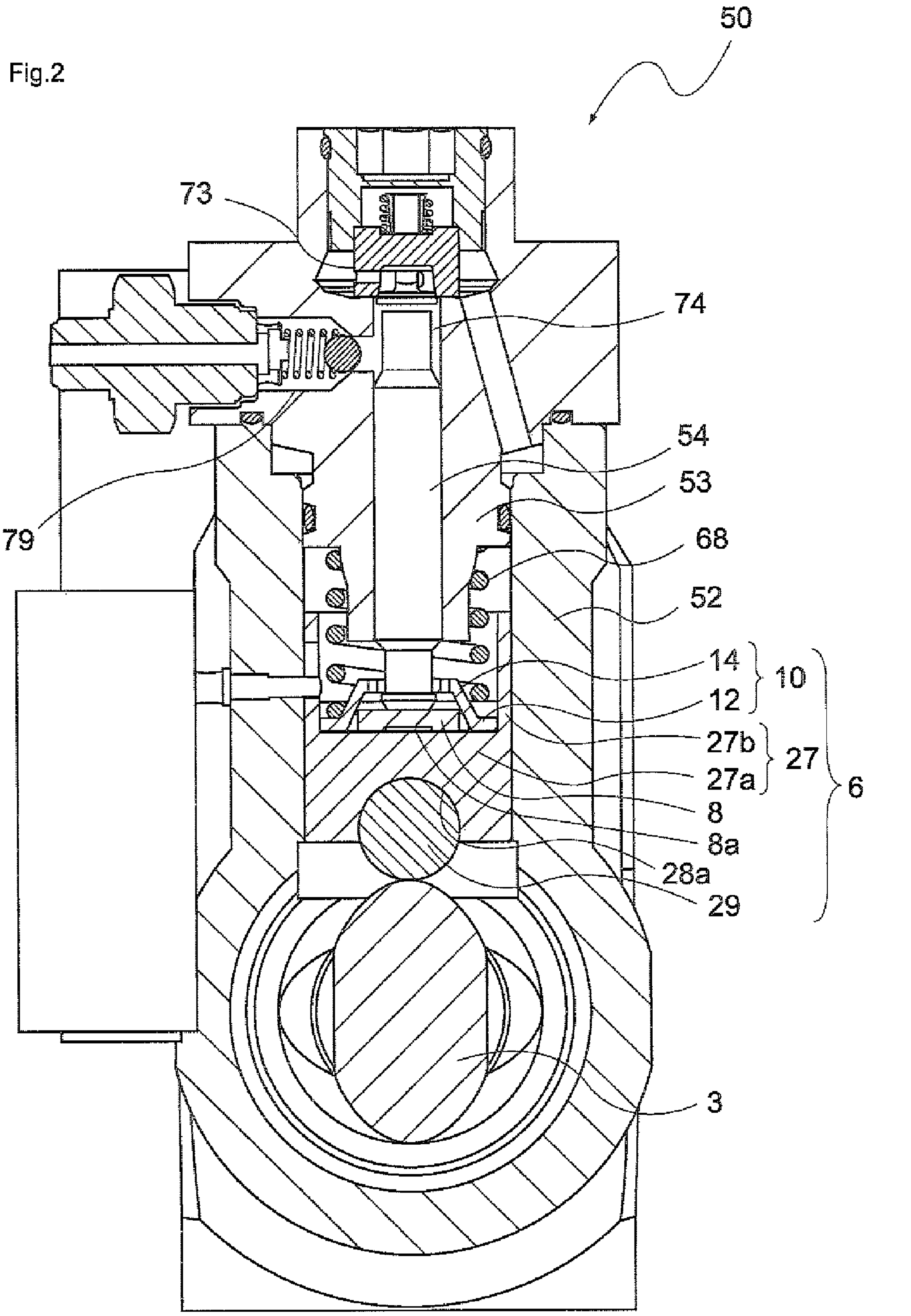
FIG. 2 is a cross-sectional diagram of the fuel supply pump of the present invention, FIGS. 3(*a*), 3(*b*) and 3(*c*) are a top plan diagram and cross-sectional diagrams, respectively, of a tappet structure body pertaining to a first embodiment, FIGS. 4(*a*), 4(*b*) and 4(*c*) are diagrams for describing a method of assembling the tappet structure body pertaining to the first embodiment, FIGS. 5(*a*), 5(*b*) and 5(*c*) are a perspective diagram, a plan diagram, respectively, and a cross-sectional diagram of a spring seat, FIGS. 6(*a*), 6(*b*) and 6(*c*) are diagrams for describing a tappet body, FIGS. 7(*a*) and 7(*b*) are diagrams for describing a roller, FIGS. 8(*a*), 8(*b*) and 8(*c*) are diagrams for describing a pressure adjusting member, FIG. 9 diagram for describing the system of a pressure-amplifying pressure-accumulating fuel injection device.

The basic configuration of the fuel supply pump is not particularly limited; for example, a fuel supply pump 50 such as shown in FIG. 1 and FIG. 2 can be used. That is, the fuel supply pump 50 can be configured, for example, from a pump housing 52, a plunger barrel (cylinder) 53, a plunger 54, a spring seat 10, a tappet structure body 6 and a cam 3.

Further, a fuel compression chamber 74 for pressurizing fuel that is introduced thereto as a result of the plunger 54 reciprocally moving in correspondence to the rotational motion of the cam 3 is disposed inside the plunger barrel 53 housed in the pump housing 52. Consequently, fuel that is pressure-fed from a feed pump can be efficiently pressurized into high-pressure fuel in the fuel compression chamber 74 by the plunger 54.

In this example of the fuel supply pump 50, two of the plunger barrels 53 and plungers 54 are disposed inside the pump housing 52, but these can also be increased to a number higher than two in order to raise the pressure of an even larger volume of fuel.

It will be noted that FIG. 1 is a cross-sectional diagram showing a cutaway of part of the fuel supply pump, and FIG. 2 is a cross-sectional diagram taken along line AA in FIG. 1.

As exemplarily shown in FIG. 1 and FIG. 2, the pump housing 52 is a casing that houses the plunger barrel 53, the plunger 54, the tappet structure body 6 and the cam 3. The pump housing 52 can be given a structure disposed with a cam shaft insertion hole 92*a* that opens in the right-left direction and cylindrical spaces 92*b* and 92*c* that open in the vertical direction.

As exemplarily shown in FIG. 2, the plunger barrel 53 is a casing for supporting the plunger 54 and is an element that configures part of the fuel compression chamber (pump chamber) 74 for the plunger 54 to pressurize a large quantity of fuel into a high pressure. Further, it is preferable for the plunger barrel 53 to be attached with respect to an open portion above the cylindrical spaces 92*b* and 92*c* of the pump housing 52 in order to facilitate assembly.

It will be noted that when the type of the fuel supply pump disposed with the plunger barrel is an inline type and a radial type, then the configuration of the plunger barrel can be appropriately altered in correspondence to the respective type.

As exemplarily shown in FIG. 2, the plunger 54 is a main element for pressurizing the fuel in the fuel compression chamber 74 inside the plunger barrel 53 into a high pressure. The plunger 54 is disposed such that it may freely rise and fall inside the plunger barrel 53 respectively disposed in the cylindrical spaces 92*b* and 92*c* of the pump housing 52.

It will be noted that it is preferable for the fuel supply pump of the first embodiment to be a pump that is rotated at a high speed to cause the cam and the plunger to be driven at a high speed and pressurize a large quantity of fuel. Specifically, the number of rotations of the pump can be a value within the range of 1,500 to 4,000 rpm, and in consideration of gear ratio, the number of rotations of the pump can be a value within the range of 1 to 5 times the number of rotations of the engine.

As shown in FIG. 2, the fuel compression chamber 74 is a small chamber formed inside the plunger barrel 53 together with the plunger 54. Consequently, the plunger 54 is driven at a high speed so that it can efficiently and in large quantity pressurize in the fuel compression chamber 74 fuel quantitatively flowing in via a fuel supply valve 73. It will be noted that it is preferable for a spring holding chamber and a cam chamber to be communicated by a later-described passage hole or the like to ensure that lubricating oil or lubricating fuel inside the spring holding chamber does not hinder the high-speed operation of the plunger 54 even when the plunger 54 moves up and down at a high speed in this manner.

Additionally, after pressurization by the plunger ends, the pressurized fuel is supplied to a common rail, for example, via a fuel outlet valve 79.

As exemplarily shown in FIG. 1 and FIG. 2, the cam 3 is a main element for changing the rotational motion of a motor into reciprocal motion of the plunger 54 via the tappet structure body 6. The cam 3 is inserted through and held in the shaft insertion hole 92*a* via a bearing body such that the cam 3 may freely rotate. Further, two cams 3 are positioned below the cylindrical spaces 92*b* and 92*c*, respectively, of the pump housing 52 and are juxtaposed in an axial line direction with a predetermined interval therebetween Additionally, the cam 3 is configured to be rotated by the driving of a cam shaft 60 that is coupled to an internal combustion engine.

Figure 3:
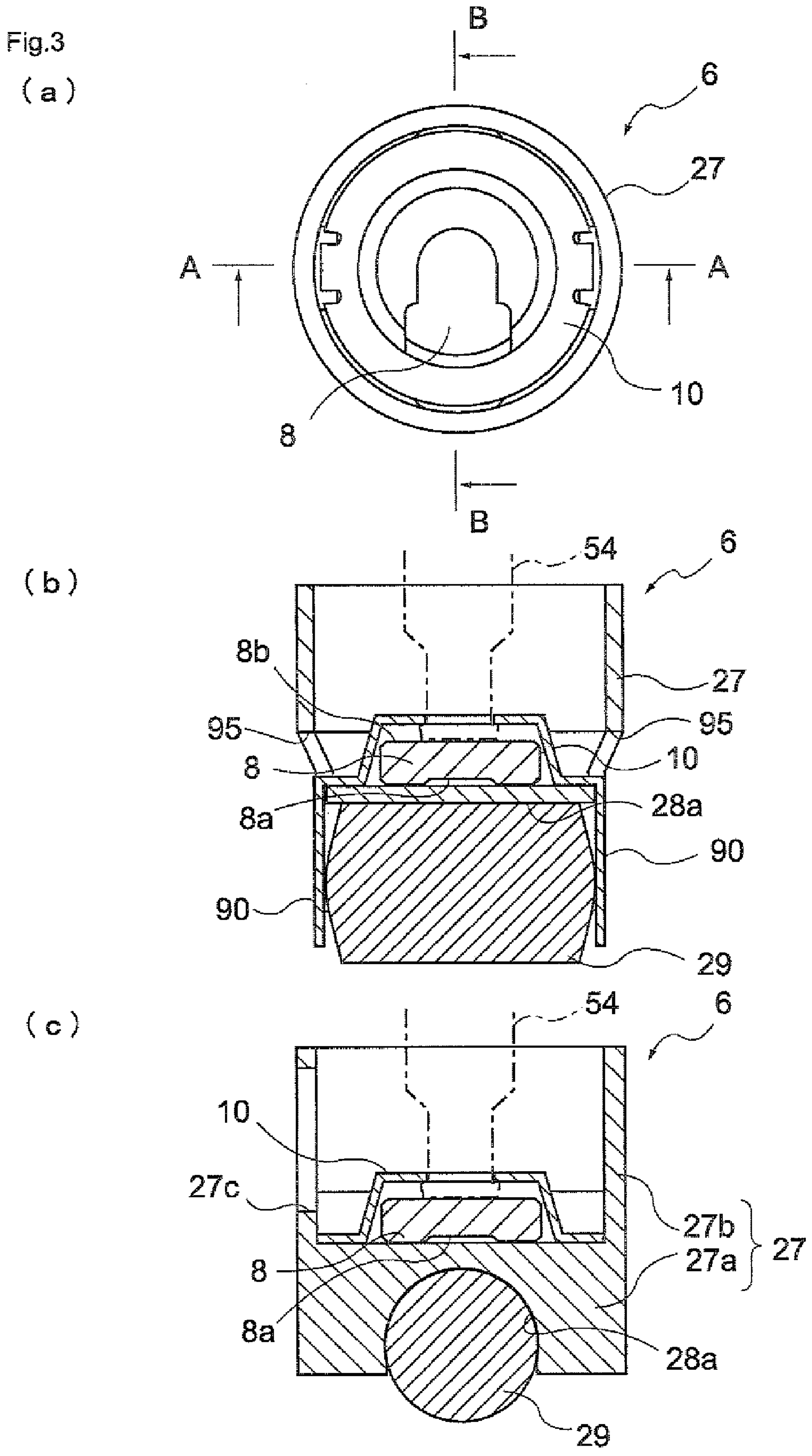
Figure 4:
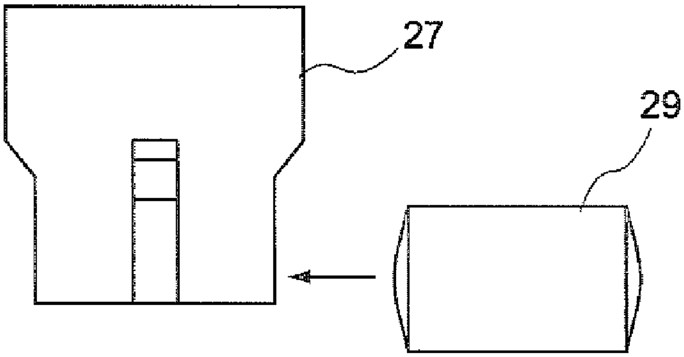
Figure 4:
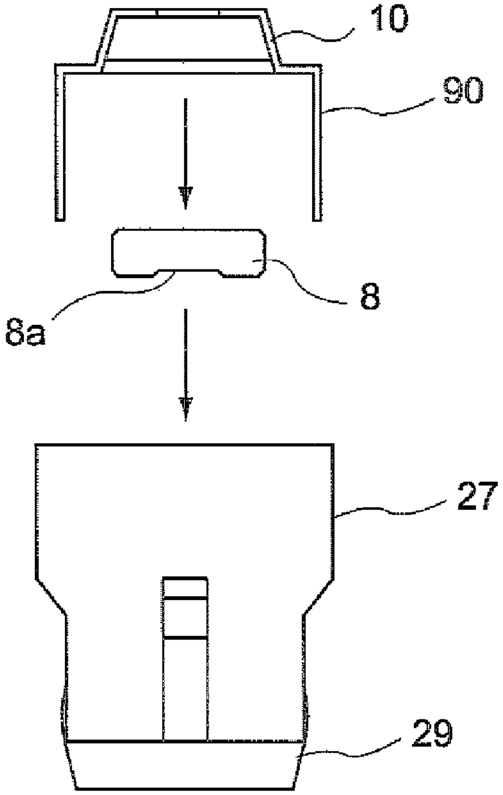
Figure 4:
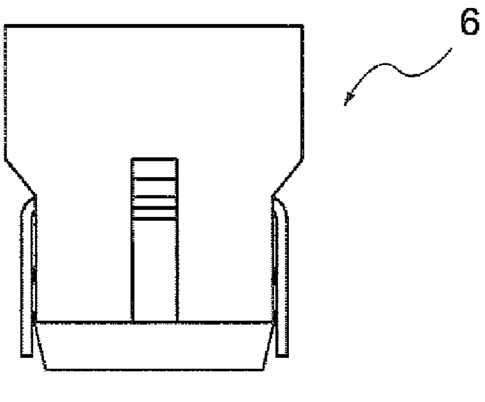

As exemplarily shown in FIGS. 3(*a*) to (*c*) and FIGS. 4(*a*) to (*c*), the tappet structure body used in the fuel supply pump of the present embodiment is the tappet structure body 6 including: the spring seat 10 that contacts an end portion of a spring; a roller 29 that contacts the cam; a tappet body 27 disposed with a roller housing portion in which the roller 29 is housed; and a pressure adjusting member 8 that is disposed so as to be interposed between the tappet body 27 and the plunger 54, presses the tappet body 27 downward when the plunger 54 falls, and pushes the plunger 54 upward when the tappet structure body 6 rises.

It will be noted that FIG. 3(*a*) is a top diagram of the tappet structure body 6, FIG. 3(*b*) is a cross-sectional diagram taken along line AA in FIG. 3(*a*), and FIG. 3(*c*) is a cross-sectional diagram taken along line BB in FIG. 3(*a*). Further, FIGS. 4(*a*) to (*c*) are diagrams for facilitating understanding of the assembly of the tappet structure body 6 of FIG. 3.

Specifically, the tappet structure body 6 is configured to include: the tappet body 27 comprising a body portion 27*a* that comprises a block body and a circular cylinder-shaped sliding portion 27*b* that extends from the body portion 27*a*; the roller 29; and the spring seat 10 that pulls the plunger 54 downward by the force of a spring, with the tappet structure body 6 being configured to be raised and lowered by the rotational motion of the cam shaft 60 show in FIG. 1 and the cam 3 coupled thereto.

Below, the basic structure of the tappet structure body 6 and the spring seat 10, the tappet body 27, the roller 29 and the pressure adjusting member 8 configured by separating the tappet structure body 6 will be specifically described with appropriate reference to the drawings.

Figure 5:
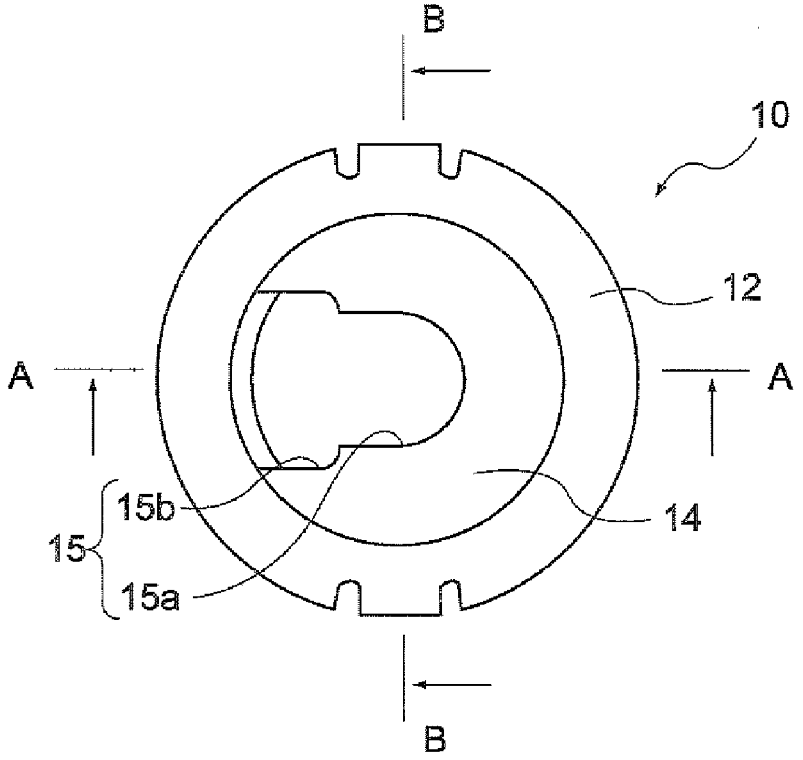
Figure 5:
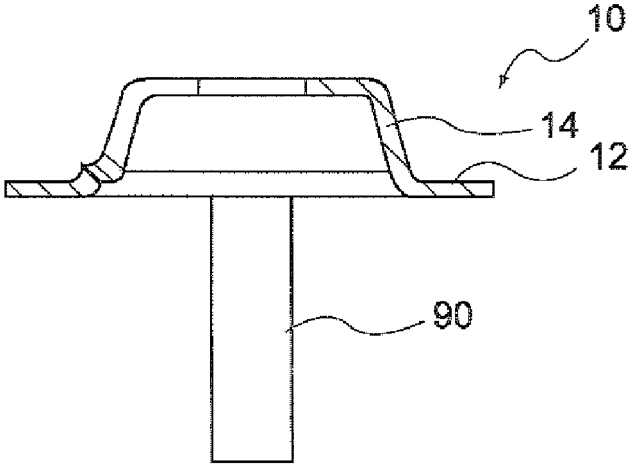
Figure 5:
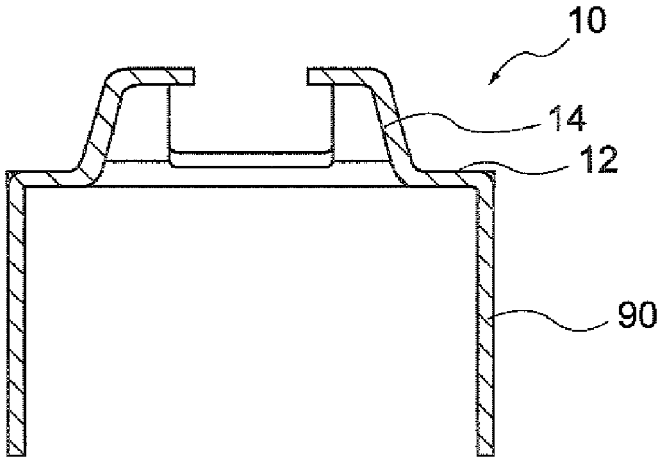

As exemplarily shown in FIGS. 5(*a*) to (*c*), the spring seat 10 used in the tappet structure body includes: a plunger attachment portion 14 for locking the plunger of the fuel supply pump; and a spring holding portion 12 for holding a spring used when pulling down the plunger disposed around the plunger attachment portion 14.

Further, part of an edge portion of the spring seat 10 extends in the direction of the end portion of the roller and is configured as regulating means 90 for regulating the movement in the rotational axis direction of the roller in the tappet structure body. Thus, the end portion of the roller can be prevented from contacting the inner peripheral surface of the pump housing even when the tappet structure body intensely moves up and down when the tappet structure body is attached inside the pump housing and the pump is operated at a high pressure and a high speed. Further, by extending part of the edge portion of the spring seat to configure regulating means, assembly of the tappet structure body or the fuel supply pump can be facilitated.

It will be noted that FIG. 5(*a*) is a plan diagram where the spring seat 10 is seen from above, FIG. 5(*b*) is a diagram where the AA cross section in FIG. 5(*a*) is seen from the direction of the arrows, and FIG. 5(*c*) is a diagram where the BB cross section in FIG. 5(*a*) is seen from the direction of the arrows.

Figure 6:
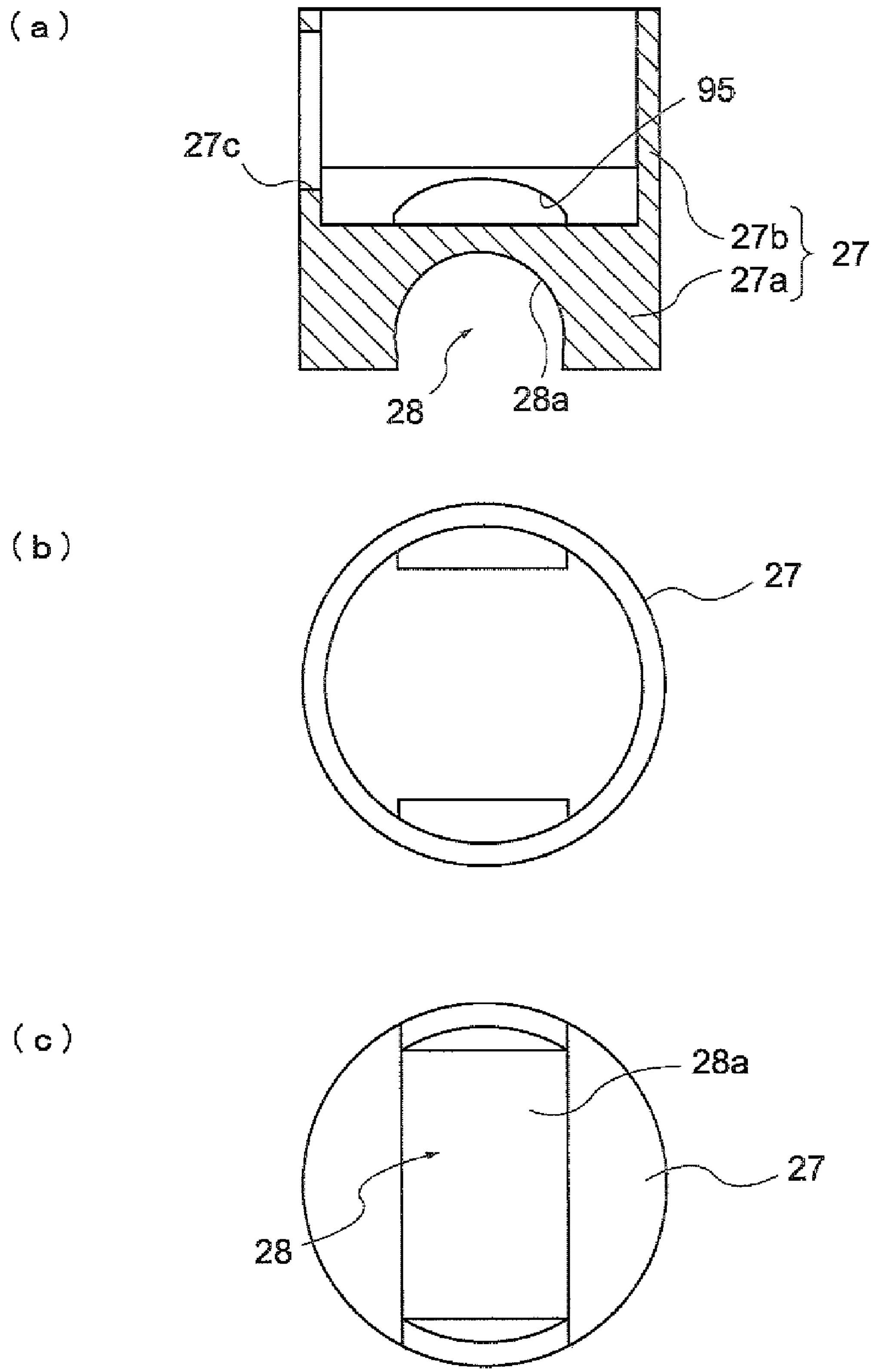

As shown in FIGS. 6(*a*) to (*c*), the tappet body entirely comprises bearing steel and is configured from the body portion 27*a* that comprises a block body and the circular cylinder-shaped sliding portion 27*b* that extends upward from the end portion of the body portion 27*a*. That is, the planar shape of the body portion 27*a* is a circular shape having an outer peripheral surface that matches the inner peripheral surface of the cylindrical spaces of the pump housing. Additionally, a space into which the spring seat and the plunger are inserted is formed inside the circular cylinder-shaped sliding portion 27*b*.

Further, an open portion (slit portion) 27*c* for a guide pin to be passed therethrough is disposed in the sliding portion 27*b* and is formed as a through hole extending in the axial line direction of the tappet body 27. Thus, when the tappet structure body 6 rises and falls, the guide pin and the open portion 27*c* can cooperate to allow the tappet structure body 6 to rise and fall along the axial line of the cylindrical spaces such that the operating direction of the tappet structure body 6 does not shift.

Further, as shown in FIG. 6(*a*), a roller housing portion 28 including a sliding surface 28*a* matching the outer peripheral surface of the roller 29 is disposed in the body portion 27*a*. Additionally, in consideration of the diameters and widths of the roller housing portion 28 and the roller 29, as shown in FIG. 3(*b*), it is preferable for the roller 29 to be able to be inserted from the side of the roller housing portion 28 and for the roller 29 to be supported such that the roller 29 may freely rotate in the roller housing portion 28.

Further, as mentioned above, when part of the edge portion of the spring seat is extended to configure roller regulating means, as shown in FIG. 6(*a*), an insertion hole 95 into which the regulating means 90 of the tappet body 27 is inserted can also be allowed to function as a passing hole for allowing lubricating oil or lubricating fuel to be transmitted there-through. That is, by disposing a gap around the regulating means 90 in the insertion hole 95 in a state where the regulating means 90 has been inserted into the insertion hole 95 of the tappet body 27, lubricating oil or the like can be easily passed between the spring holding chamber and the cam chamber via that gap. Consequently, the high-speed up and down motion of the tappet structure body—and therefore the plunger—is no longer inhibited.

Figure 7:
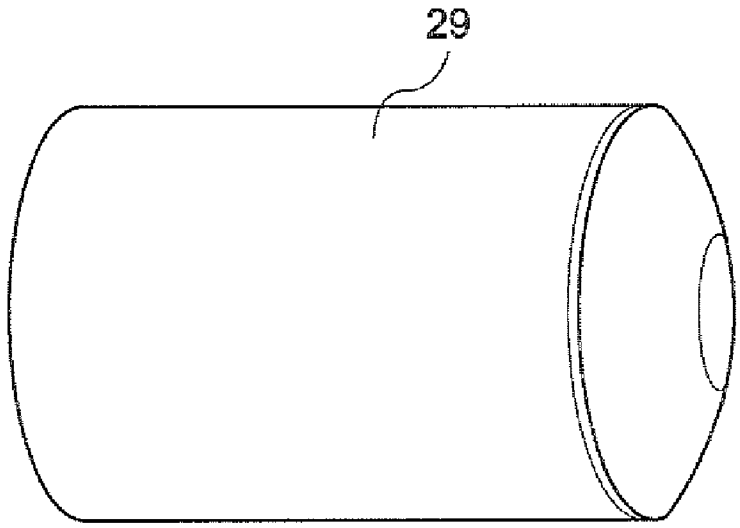
Figure 7:
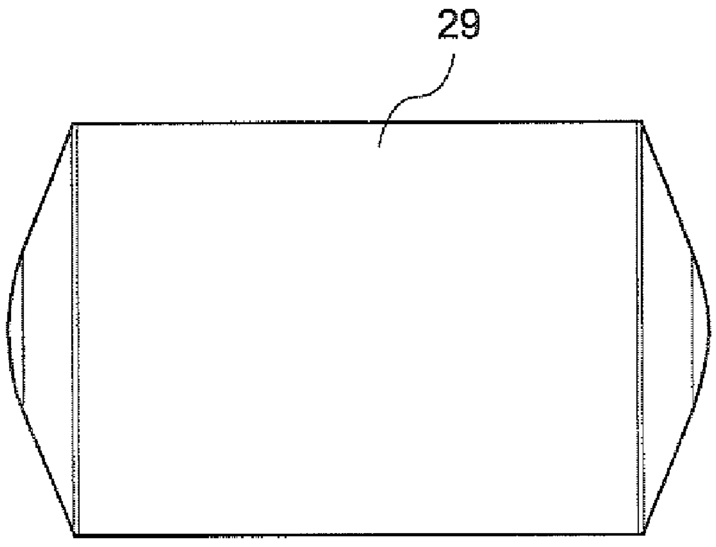

As shown in FIGS. 7(*a*) and (*b*), it is preferable for the roller 29 to have a configuration where the roller is not divided into a roller pin portion and a roller portion but rather one where these are integrated. The reason for this is so that the entire tappet body can receive the load from the roller 29 and can withstand an even higher load in comparison to when the roller is configured by combining a roller pin portion and a roller portion as separate parts. Further, this is also so that there is no longer the need to consider resistance that has arisen between the roller pin portion and the roller portion and to enable the roller 29 to be rotated at a higher speed. Moreover, this is also so that there is no longer the need to dispose, in the tappet body, a hole for inserting the roller pin portion, so that the configuration of the tappet body can be simplified.

Further, the roller 29 is inserted from the side with respect to the roller housing portion disposed with the sliding surface to whose entire surface carbonization has been administered, such as a carbon coating film, and is supported such that the roller 29 may freely rotate. Additionally, the roller is configured to contact the cam communicated with the cam shaft and to receive the rotational force of the cam. Thus, the rotational force of the cam can be transmitted to the tappet body via the roller 29, and therefore the plunger can be efficiently caused to reciprocally move up and down.

The pressure adjusting member is disposed so as to be interposed between the tappet body and the plunger in the upper surface of the tappet body and is a member for preventing the pressing force loaded from the plunger from becoming concentrated in the center portion of the tappet body. As exemplarily shown in FIGS. 8(*a*) to (*c*), the pressure adjusting member 8 includes a concave portion 8*a* in the center portion of its surface that faces the tappet body and is configured to contact the tappet body at the peripheral edge portion of the concave portion 8*a*. Because the tappet structure body is disposed with such a pressure adjusting member, the pressing force loaded by the plunger from above and the pressure loaded via the roller from the cam below can be dispersed to the peripheral portion of the tappet body and prevented from becoming concentrated in the vicinity of the highest portion of the sliding surface. Consequently, damage to the sliding surface of the tappet body can be prevented and the durability of the tappet structure body can be remarkably improved. Thus, even when the tappet structure body is used in a fuel supply pump of a pressure-amplifying pressure-accumulating fuel injection device, the tappet structure body can even withstand high-pressure high-speed operation over a long period of time and can stably supply fuel.

Figure 8:
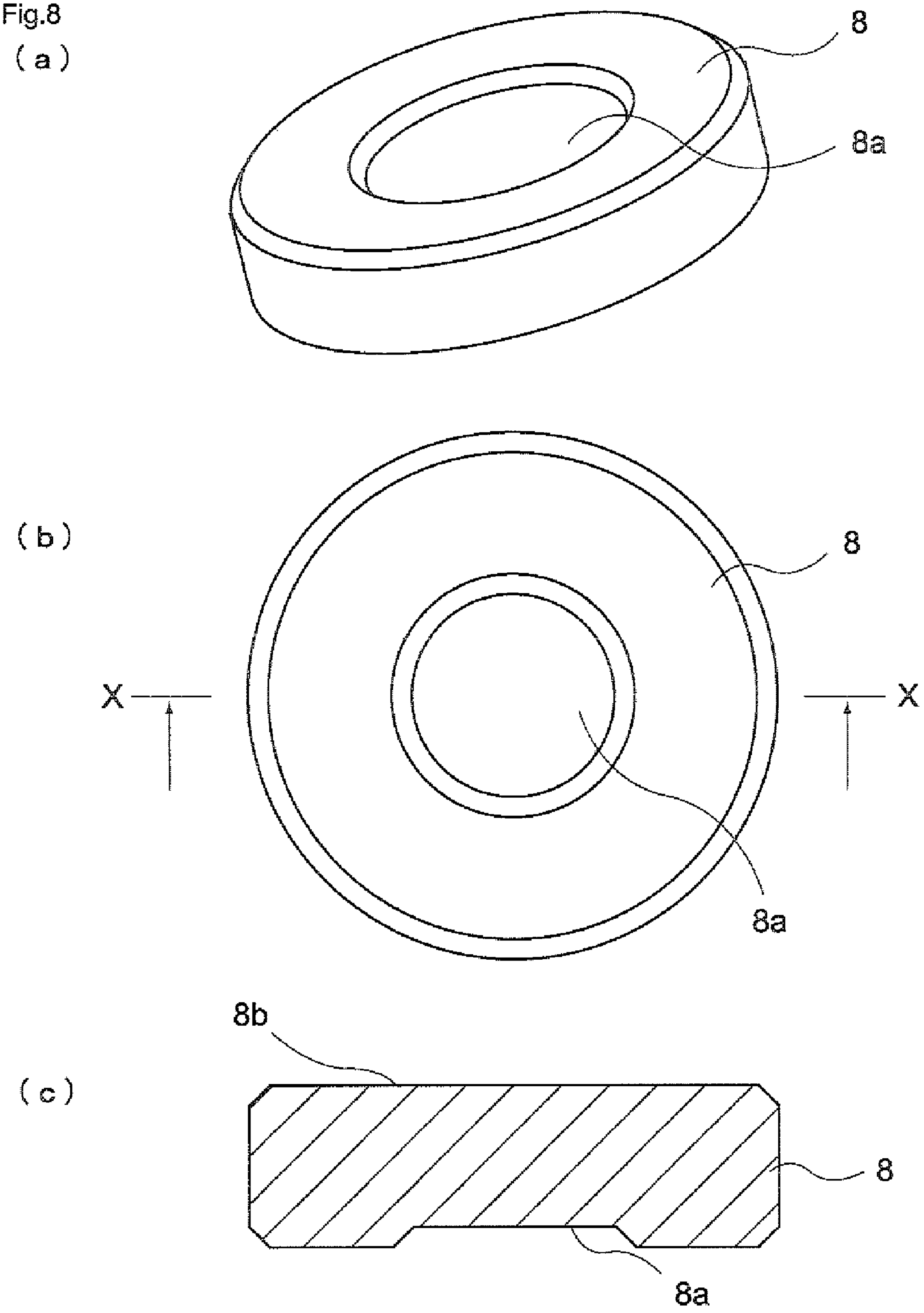

Here, as shown in FIGS. 8(*a*) to (*c*) as one example, the pressure adjusting member 8 can be a cylindrical member whose diameter is larger than the diameter of the distal end portion of the plunger and whose height is smaller than its diameter, and can be given a structure where the concave portion 8*a* is disposed in the center portion of its surface that faces the tappet body. By configuring the pressure adjusting member in this manner, the pressure adjusting member no longer contacts the center portion of the upper surface of the tappet body portion, so the pressing force loaded from the plunger can be efficiently dispersed to the peripheral portion and the pressure loaded to the center portion of the tappet body can be reduced.

Further, it is preferable for the planar shape of the concave portion disposed in this case to be a circular shape with a diameter larger than the diameter of the distal end portion of the plunger. The reason for this is so that, with such a concave portion, the pressing force from the plunger can be prevented from being loaded to the center portion of the tappet body in an amount corresponding at least to the size of the distal end portion of the plunger and so that the pressure can be dispersed to the outer peripheral portion, However, when the diameter of the concave portion becomes excessively large, sometimes the strength of the pressure adjusting member drops due to the relationship with the thickness and the like of the pressure adjusting member, so it is preferable, for example, for the diameter of the concave portion in the pressure adjusting member to be substantially equal to the diameter of the distal end portion of the plunger.

It will be noted that FIG. 8(*a*) is a perspective diagram of the pressure adjusting member 8, FIG. 8(*b*) is a plan diagram where the pressure adjusting member 8 is seen from the surface that faces the tappet body, and FIG. 8(*c*) is a cross-sectional diagram where the XX cross section in FIG. 8(*b*) is seen from the direction of the arrows.

Further, it is preferable for the thickness (height) of the pressure adjusting member to be a value within the range of 4 to 10 mm. The reason for this is because, when the thickness of the pressure adjusting member is a value less than 4 mm, sometimes the strength of the pressure adjusting member itself drops because of the relationship with the depth of the disposed concave portion. This is also because when the thickness of the pressure adjusting member is greater than 10 mm, sometimes the tappet structure body ends up becoming larger.

Consequently, it is more preferable for the thickness of the pressure adjusting member to be a value within the range of 4.5 to 9 mm and even more preferably a value within the range of 5 to 8 mm.

Moreover, it is preferable for the depth of the disposed concave portion to be a value within the range of 0.2 to 0.8 mm. The reason for this is because, when the depth of the concave portion is a value less than 0.2 mm, sometimes the inner portion of the concave portion ends up contacting the tappet body due to variations in the degree of flatness of the surface of the pressure adjusting member and the tappet body. This is also because, when the depth of the concave portion exceeds 0.8 mm, sometimes the strength of the pressure adjusting member drops.

Consequently, it is more preferable for the depth of the disposed concave portion to be a value within the range of 0.25 to 0.7 mm and more preferably a value within the range of 0.3 to 0.6 mm.

Further, as shown in FIG. 3(*b*) and FIG. 8(*c*), it is preferable for a contact surface 8*b* of the pressure adjusting member 8 that contacts the plunger to be a flat surface.

The reason for this is because, when the contact surface that contacts the plunger is not a flat surface, the pressure adjusting member and the plunger contact each other over a relatively small area and it becomes easier for pressure to become concentrated in and damage that contact place.

Consequently, because the pressure adjusting member is disposed with the flat surface, the pressure adjusting member can be allowed to contact the plunger over a relatively large area and damage resulting from pressure becoming concentrated can be prevented.

Further, as shown in FIGS. 8(*a*) to (*c*), it is preferable for each of the corner portions (peripheral edges) of the pressure adjusting member 8 to be chamfered.

The reason for this is so that pressure can be prevented from becoming concentrated in and damaging the corner portions when the plunger and the pressure adjusting member, or the tappet body and the pressure adjusting member, contact each other under a high-pressure state.

More specifically, the tappet structure body is caused to rise as a result of the cam rotating, but sometimes the tappet structure body slants somewhat depending on the design precision. In this case, sometimes the pressure applied between the tappet body and the pressure adjusting member becomes non-uniform. When this happens, in a state where the corner portions have not been chamfered, sometimes the pressure becomes concentrated at the corner portions and sometimes ends up damaging the place where the tappet body contacts the corner portion. Consequently, by chamfering the corner portions of the pressure adjusting member, concentration of the pressure at one point can be prevented and damage can be prevented even when the pressure acting between the tappet body and the pressure adjusting member becomes non-uniform.

Further, the material configuring the pressure adjusting member is not particularly limited as long as it can exhibit a predetermined strength, and it is preferable for the pressure adjusting member to comprise bearing steel, for example.

The reason for this is because, by using a pressure adjusting member comprising bearing steel, the pressure adjusting member can exhibit durability even when it is used in a pressure-amplifying pressure-accumulating fuel supply pump and can stably supply fuel.

Further, as shown in FIG. 3(*b*), it is preferable for the outer shape of the pressure adjusting member 8 to be given a size that is substantially the same as the size of the inner surface of the plunger attachment portion 14 in the aforementioned spring seat 10 and for the pressure adjusting member 8 to be placed on the upper surface of the tappet body 27 and covered by the spring seat 10 such that its position is fixed.

The reason for this is so that the disposed position of the pressure adjusting member can be fixed without increasing the number of parts. Consequently, even when the tappet structure body rises and falls during operation of the fuel supply pump, the pressure adjusting member is prevented from moving so that it does not damage parts other than the pressure adjusting member, and so that the fuel supply pump can be stably operated at a high pressure and a high speed.

As shown in FIG. 2, a fuel inlet valve 73 and a fuel outlet valve 79 have a valve body 20 that is disposed in part of the plunger barrel 53 and includes a collar part in its distal end, are always energized in a valve closing direction by a return spring, and are configured to allow fuel to pass therethrough by opening and closing.

Further, the lubrication system of the fuel supply system is not particularly limited; for example, a fuel lubrication system that uses some fuel oil as a lubrication component (lubricant fuel) can be employed.

Thus, when fuel is to be pressurized and the fuel is pressure-fed to a common rail, even if some of the fuel for lubricating the cam chamber and the like were to become mixed with the fuel that is pressure-fed to the common rail, these are the same components, so there is no longer a situation where additives and the like included in the lubricant become mixed with the fuel that is pressure-fed to the common rail, such as when lubricant is used to lubricate the cam chamber and the like. Consequently, there become fewer instances where exhaust gas purification drops.

Further, the fuel supply pump of the first embodiment can configure part of a pressure-amplifying pressure-accumulating fuel injection device including the following configuration, for example.

Figure 9:
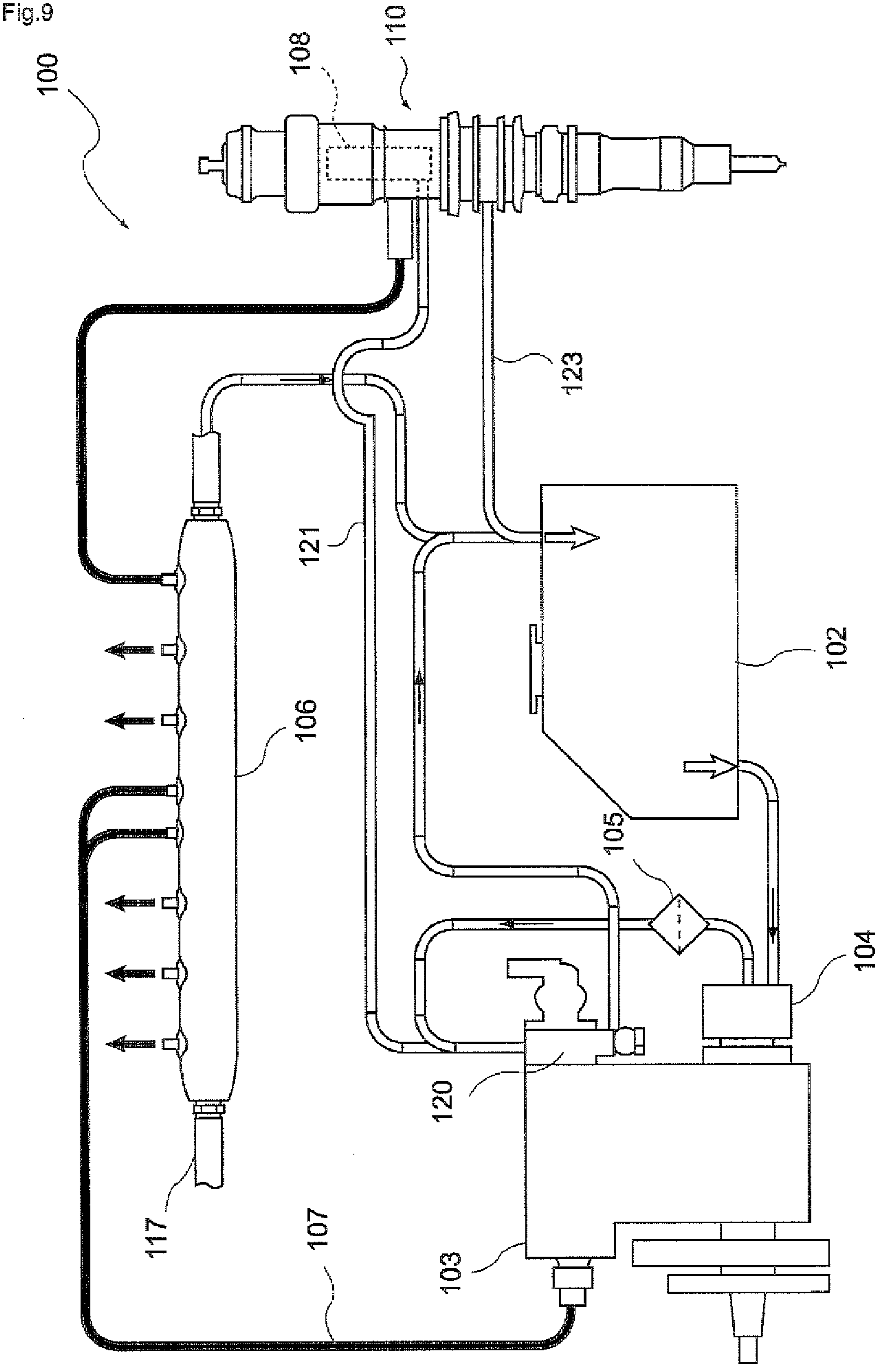

That is, as exemplarily shown in FIG. 9, it is preferable for the pressure-amplifying pressure-accumulating fuel injection device to be configured from a fuel tank 102, a feed pump (low pressure pump) 104 for supplying the fuel of the fuel tank 102, a fuel supply pump (high pressure pump) 103, a common rail 106 serving as a pressure accumulator for pressure-accumulating the fuel pressure-fed from the fuel supply pump 103, a pressure amplifying device (pressure amplifying piston) 108 for further pressurizing the fuel pressure-accumulated by the common rail 106, and a fuel injection device 110.

With respect to the capacity and configuration of the fuel tank 102 exemplarily shown in FIG. 9, it is preferable for the flow rate per unit time to be determined in consideration of being able to circulate fuel of about 500 to 1,500 liters/hour.

Further, the feed pump 104 pressure-feeds the fuel (light oil) inside the fuel tank 102 to the fuel supply pump 103, and a filter 105 is interposed between the feed pump 104 and the fuel supply pump 103. Additionally, although this feed pump 104 is but one example, it includes a gear pump structure, is attached to the end portion of the cam, and is directly coupled to the cam shaft via the driving of a gear or driven via an appropriate gear ratio.

Further, the fuel pressure-fed via the filter 105 from the feed pump 104 is supplied to the fuel supply pump 103 via a proportional control valve 120 that performs injection amount adjustment.

Further, the fuel supplied from the feed pump 104 is configured to be pressure-fed with respect to the proportional control valve 120 and the fuel supply pump 103 and be returned to the fuel tank 102 via an overflow valve (not shown) disposed in parallel to the proportional control valve 120. Moreover, some of the fuel is pressure-fed to a cam chamber of the fuel supply pump 103 via an orifice attached to the overflow valve and is used as fuel lubricant for the cam chamber.

Further, the configuration of the common rail 106 is not particularly limited and a publicly known configuration can be used; for example, as shown in FIG. 9, the common rail 106 can be given a configuration where plural injectors (injection valves) 110 are connected to the common rail 106 so that the fuel that has been pressure-accumulated at a high pressure by the common rail 106 is injected to the inside of an internal combustion engine (not shown) from each of the injectors 110. By configuring the common rail 106 in this manner, the injection pressure is not affected by variations in the number of rotations of the engine, and the fuel can be injected to the engine via the injectors 110 at an injection pressure commensurate with the number of rotations.

Further, a pressure detector 117 is connected to the common rail 106, and a pressure detection signal obtained by the pressure detector 117 is sent to an electronical controlling unit (ECU). Additionally, when the ECU receive the pressure detection signal from the pressure detector 117, the ECU controls an electromagnetic control valve (not shown) and controls the proportional control valve in accordance with the detected pressure.

Figure 10:
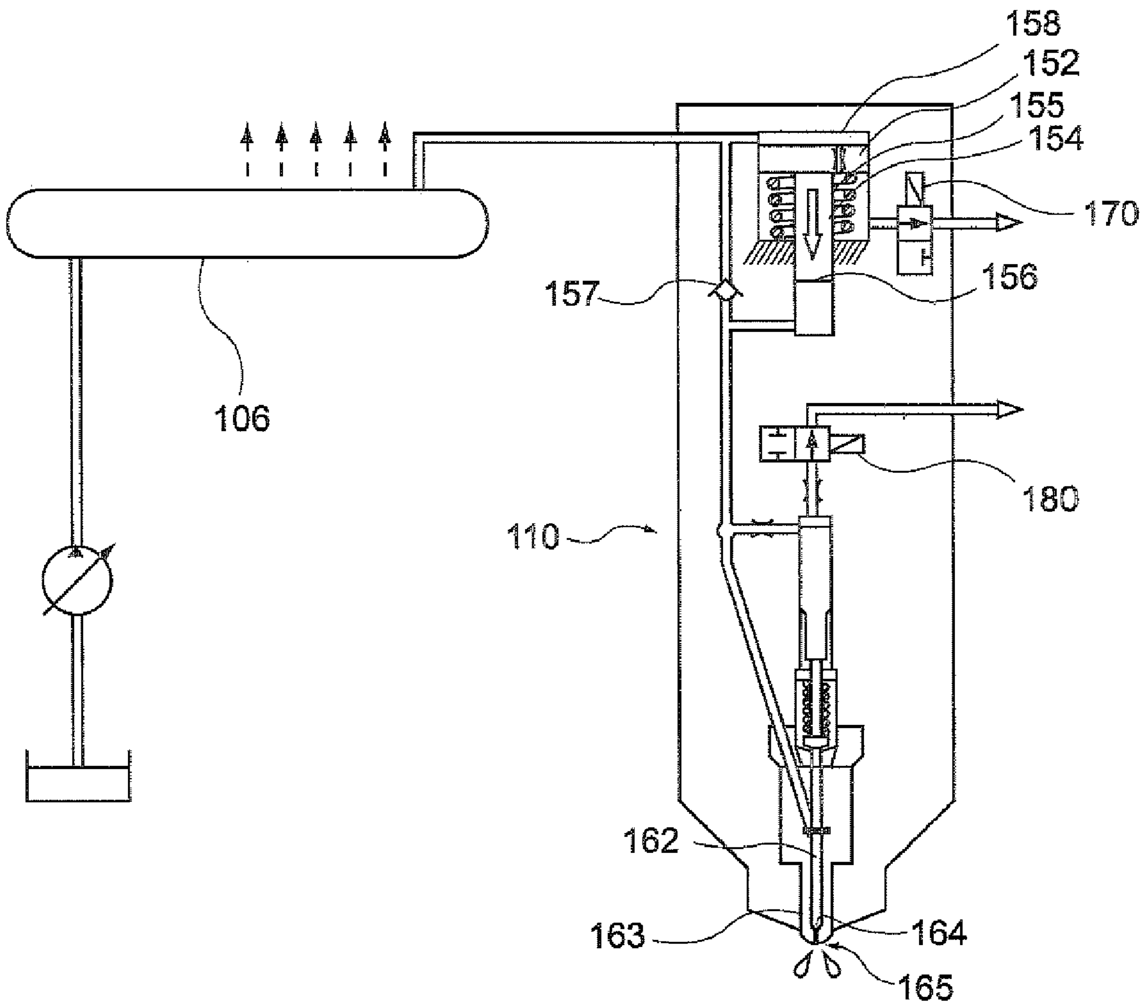
FIG. 10 is a diagram for describing the structure of a pressure-amplifying pressure-accumulating fuel injection device.

Further, as exemplarily shown in FIG. 10, the pressure-amplifying device can be given a configuration that includes a cylinder 155, a mechanical piston pressure-amplifying piston) 154, a pressure-receiving chamber 158, an electromagnetic valve 170, and a circulation path 157, with the mechanical piston 154 being disposed with a pressure-receiving portion 152 that has a relatively large area and a pressurizing portion 156 that has a relatively small area.

Thus, the mechanical piston 154 housed inside the cylinder 155 is pressed by fuel having the common rail pressure in the pressure-receiving portion 152 and moves, and fuel having the common rail pressure of the pressure-receiving chamber 158—for example, a pressure of about 25 to 100 MPa—is further pressurized by the pressurizing portion 156 that has a relatively small area and can be given a value within the range of 150 MPa to 300 MPa, for example.

Further, although fuel having the common rail pressure is used in large quantity in order to pressurize the mechanical piston 154, it is preferable for the fuel to be channeled back to the fuel inlet of the high pressure pump via the electromagnetic valve 170 after pressurization. Thus, as shown in FIG. 9, a large portion of fuel having the common rail pressure pressurizes the mechanical piston 154, is thereafter channeled back to the fuel inlet of the high pressure pump 103 via a line 121, for example, and can again be used to pressurize the mechanical piston 154.

On the other hand, the fuel whose pressure has been amplified by the pressurizing portion 156 is, as shown in FIG. 10, delivered to a fuel injection device (fuel injection nozzle) 163 and efficiently injected and combusted, and the fuel flowing out from an electromagnetic valve 180 of the fuel injection device becomes channeled back to the fuel tank 102 via a line 123.

Consequently, by disposing such a pressure-amplifying device, the common rail is not made excessively large and the mechanical piston can be effectively pressed by fuel having the common rail pressure in an arbitrary time period.

Figure 11:
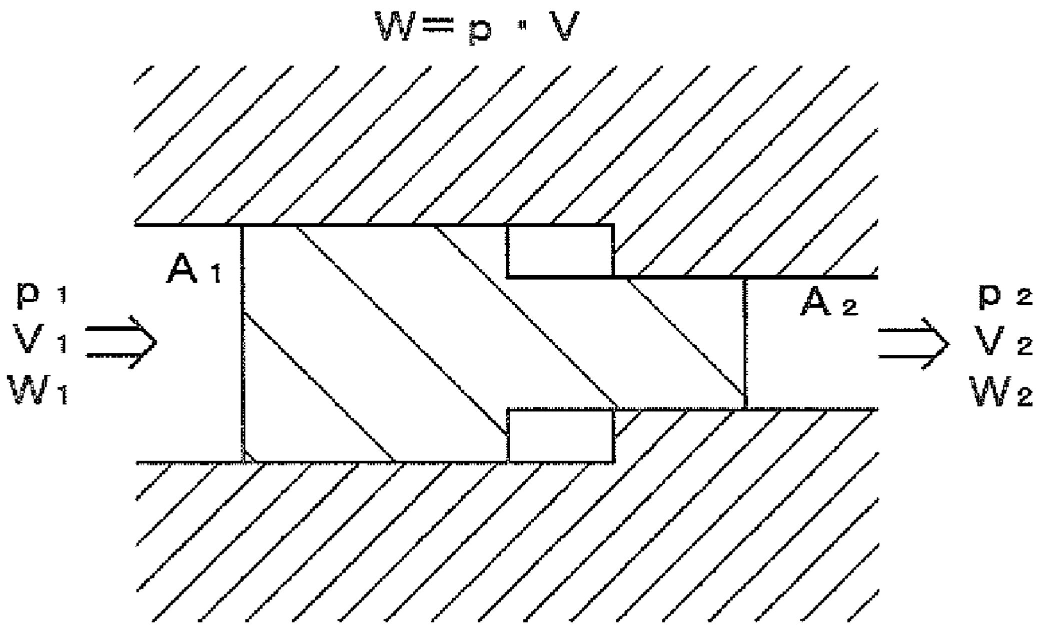
FIG. 11 is a diagram conceptually showing a method of amplifying the pressure of fuel by a pressure-amplifying pressure-accumulating fuel injection device.

That is, as shown in the schematic diagram of FIG. 11, according to the pressure-amplifying pressure-accumulating fuel injection device, the mechanical piston is disposed with the pressure-receiving portion that has a relatively large area and the pressurizing portion that has a relatively small area, and by considering the stroke amount of the mechanical piston, it is possible to reduce pressure loss and efficiently amplify the pressure of the fuel having the common rail pressure to a desired value.

More specifically, the fuel from the common rail (pressure: p1, volume: V1, work amount: W1) can be received by the pressure-receiving portion that has a relatively large area and be made into fuel with a higher pressure (pressure: p2, volume: V2, work amount: W2) by the mechanical piston disposed with the pressurizing portion that has a relatively small area.

Further, the configuration of the fuel injection device (injector) 110 is not particularly limited; for example, as exemplarily shown in FIG. 10, the fuel injection device 110 can be given a configuration disposed with a nozzle body 163 including a seat surface 164 on which a needle valve body 162 sits and an injection hole 165 formed further on the downstream side than a valve body contact site of the seat surface 164, with the fuel supplied from the upstream side of the seat surface 164 when the needle valve body 162 lifts being guided to the injection hole 165.

Further, the fuel injection device 110 can be an electromagnetic valve type where the needle valve body 162 is always energized toward the seat surface 164 by a spring 161 or the like such that the needle valve body 162 is opened and closed by switching between powering and not powering a solenoid 180.

Figure 12:
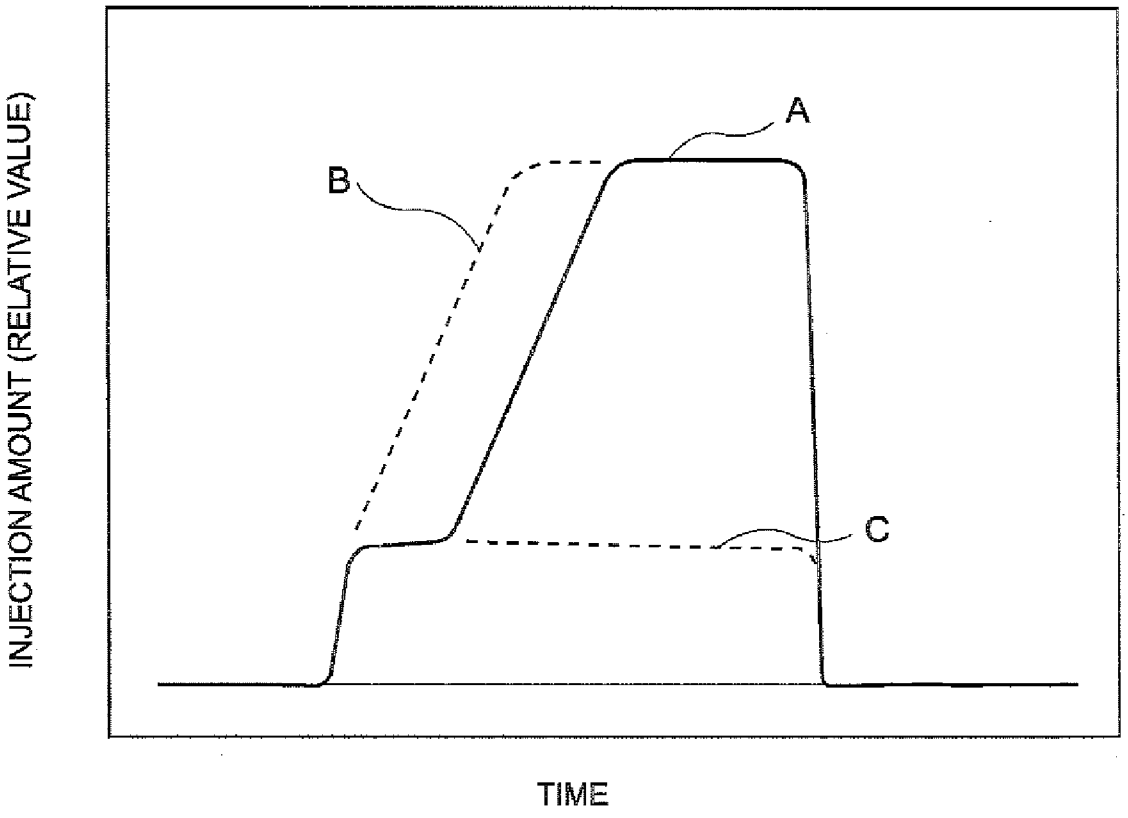
FIG. 12 is a diagram for describing a high-pressure fuel injection timing chart, FIGS. 13(*a*), 13(*b*) and 13(*c*) are diagrams for describing a tappet structure body disposed with a concave portion pertaining to a second embodiment, FIGS. 14(*a*), 14(*b*) and 14(*c*) are diagrams for describing a tappet structure body disposed with a void pertaining to the second embodiment, FIGS. 15(*a*) and 15(*b*) are diagrams for describing modifications of the tappet structure body disposed with the concave portion, FIGS. 16(*a*) and 16(*b*) are diagrams for describing a tappet structure body disposed with a mount member.

Further, as exemplarily shown in the injection chart of FIG. 12, the injection timing of the high-pressure fuel can be an injection timing having a two-stage injection state such as represented by solid line A. Such a two-stage injection timing chart can be achieved by a combination of the aforementioned common rail pressure and the amplified pressure in the pressure-amplifying device (pressure-amplifying piston), whereby the fuel combustion efficiency can be raised and the exhaust gas can be purified.

Further by a combination of the common rail pressure and the amplified pressure timing in the pressure-amplifying device (pressure-amplifying piston), the injection timing can also be made into an injection timing showing an injection timing chart such as represented by dotted line B in FIG. 12.

It will be noted that when the pressure-amplifying device (pressure-amplifying piston) is not used, that is, the conventional injection timing chart becomes a one-stage injection timing chart of a low injection amount such as represented by dotted line C in FIG. 12.

Even when the fuel supply pump of the first embodiment is used as a fuel supply pump of a pressure-amplifying pressure-accumulating fuel injection device such as mentioned above, it can efficiently allow the pressing force loaded from the plunger to be dispersed to the peripheral portion of the tappet body and effectively prevent damage to the sliding surface of the roller housing portion because the fuel supply pump is disposed with the predetermined pressure adjusting member. Consequently, the durability of the tappet structure body can be dramatically improved and the fuel can be stably supplied even when operated at a high pressure and a high speed over a long period of time.

In a second embodiment of a fuel supply pump including, as the tappet structure body in the fuel supply pump of the first embodiment, the tappet structure body 6 including the roller that contacts the cam and the tappet body disposed with the roller housing portion for housing the roller, wherein the tappet body includes one of either a concave portion formed in the center portion of the upper surface of the tappet body or a void formed in the inside of the tappet body in order to allow the pressing force from the plunger when the tappet structure body rises or falls to be dispersed to the peripheral portion of the tappet body.

Below, the tappet structure body that is a point different from the first embodiment will be centrally described, and description will be appropriately omitted in regard to points other tan this.

Figure 13:
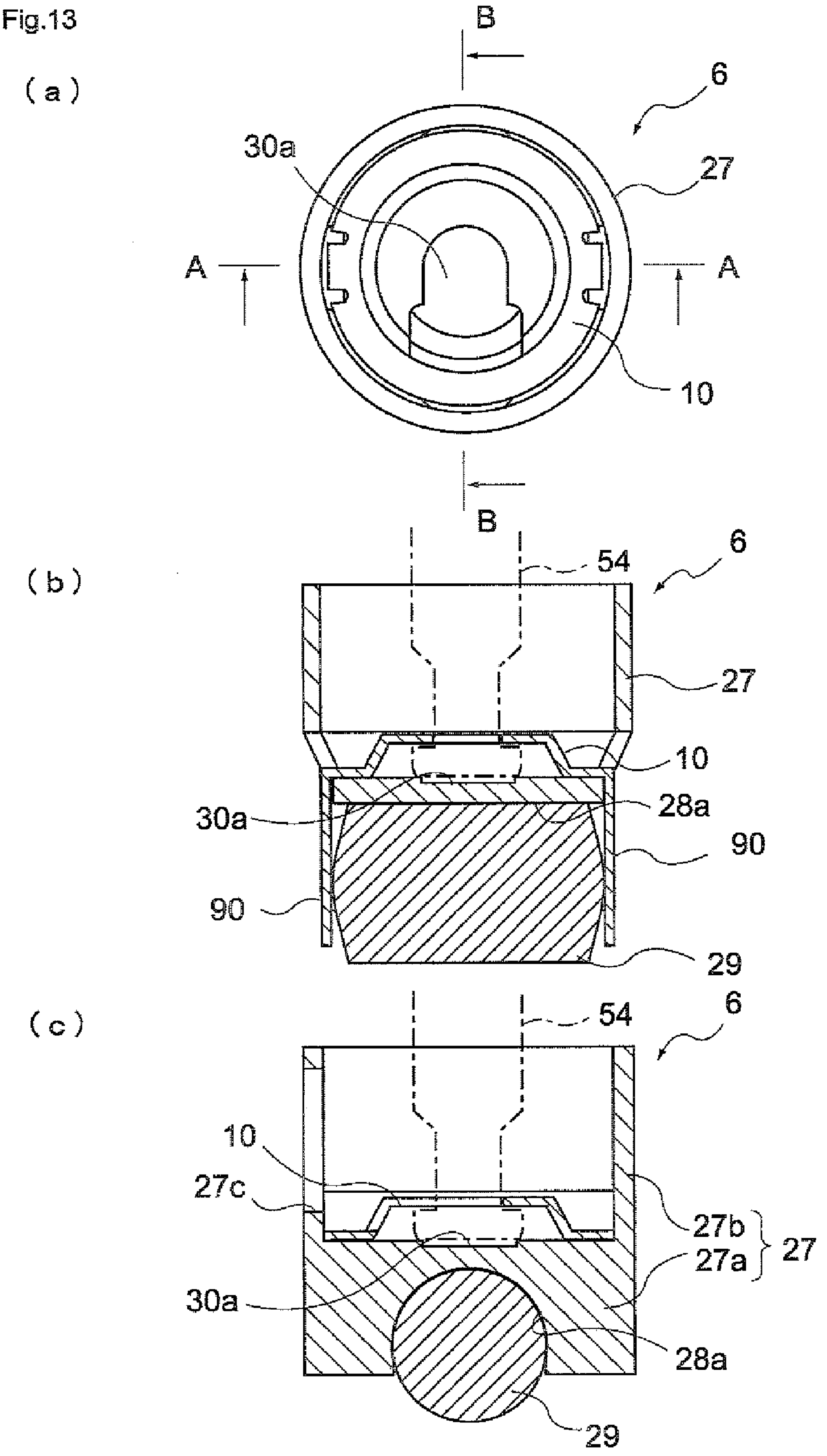
Figure 14:
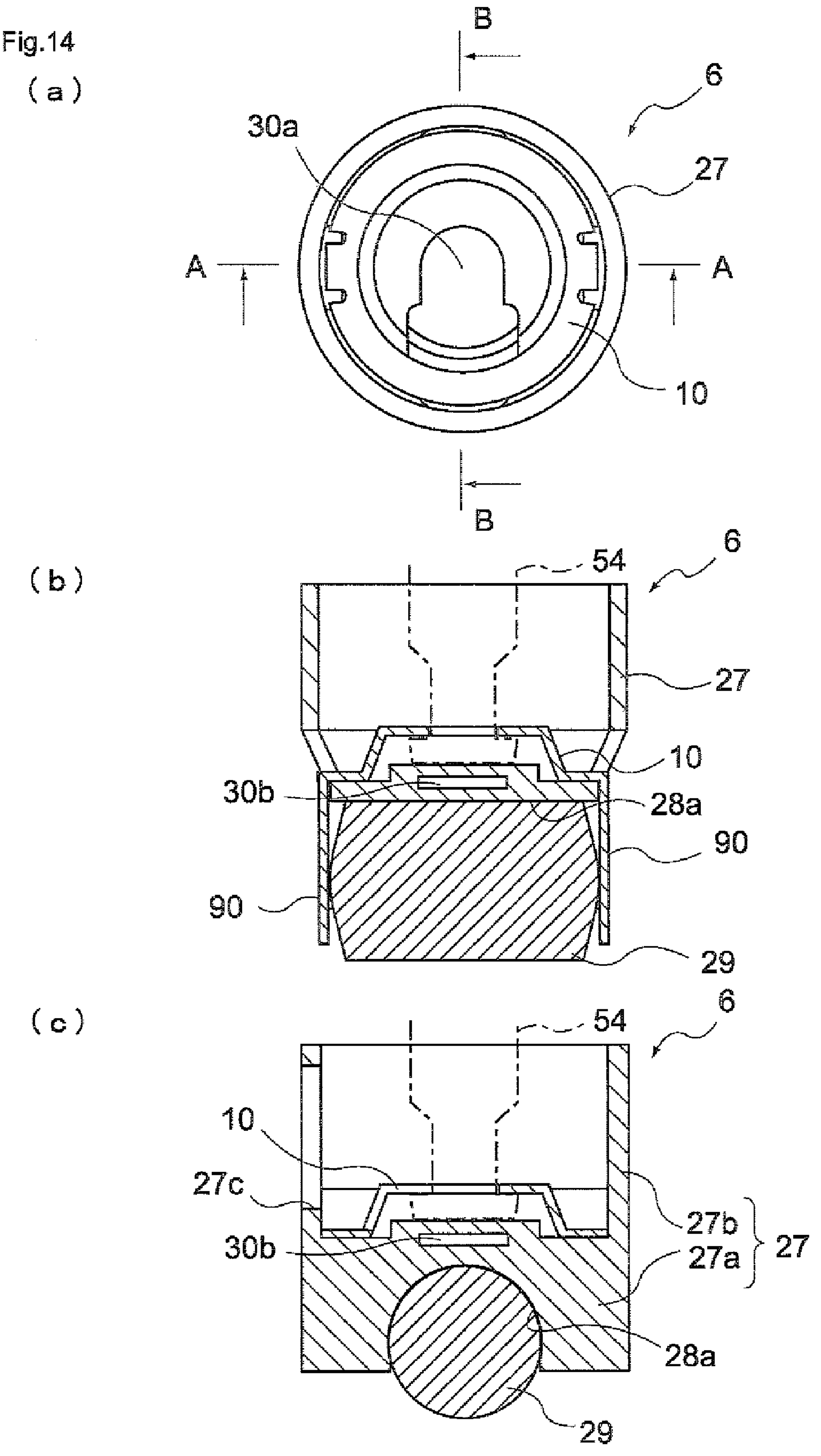

As exemplarily shown in FIG. 13 and FIG. 14, the tappet structure body in the fuel supply pump of the present embodiment is, basically similar to the tappet structure body in the first embodiment, configured from the tappet body 27 comprising the body portion 27*a* that comprises a block body and the circular cylinder-shaped sliding portion 27*b* that extends from the peripheral edge portion of the body portion 27*a* and the roller 29, with the tappet structure body being configured to be raised and lowered by the rotational motion of the cam shaft and the cam coupled thereto. Of these configural members, the roller 29 can be given the same configuration as that of the roller used in the tappet structure body of the first embodiment.

The tappet structure body 6 of the present embodiment is not disposed with the pressure adjusting member in the tappet structure body of the first embodiment, but instead the tappet body 27 is disposed with a predetermined concave portion 30*a* or void 30*b*. That is, the basic configuration of the tappet body 27 serving as the characteristic portion of the present embodiment is the same as that of the tappet body in the tappet structure body of the first embodiment but is different from the tappet body in the first embodiment in that the concave portion 30*a* is disposed in the center portion of the upper surface of the tappet body 27 or the void 30*b* is disposed in the inside of the tappet body 27.

It will be noted that FIG. 13(*a*) is a plan diagram where the tappet structure body 6 is seen from its upper side, FIG. 13(*b*) is a cross-sectional diagram where the AA cross section in FIG. 13(*a*) is seen from the direction of the arrows, and FIG. 13(*c*) is a cross-sectional diagram where the BB cross section in FIG. 13(*a*) is seen from the direction of the arrows. Further, FIGS. 14(*a*) to (*c*) also similarly show a top plan diagram and cross-sectional diagrams.

FIGS. 13(*a*) to (*e*) are diagrams showing the tappet structure body 6 disposed with the tappet body 27 in which the predetermined concave portion 30*a* is formed. As shown in FIG. 13(*b*), when the concave portion 30*a* is disposed in the center portion of the upper surface of the tappet body 27, the contact surface of the upper surface of the tappet body 27 that contacts the plunger 54 can be positioned in the peripheral portion excluding the center portion of the tappet body 27, so the pressing force loaded to the tappet body 27 when the tappet structure body 6 rises or falls can be dispersed to the peripheral portion.

Consequently, a situation where the roller rolls in a state where pressure is locally loaded with respect to the sliding surface in the roller housing portion of the tappet body can be prevented and damage to the sliding surface can be prevented.

Figure 15:
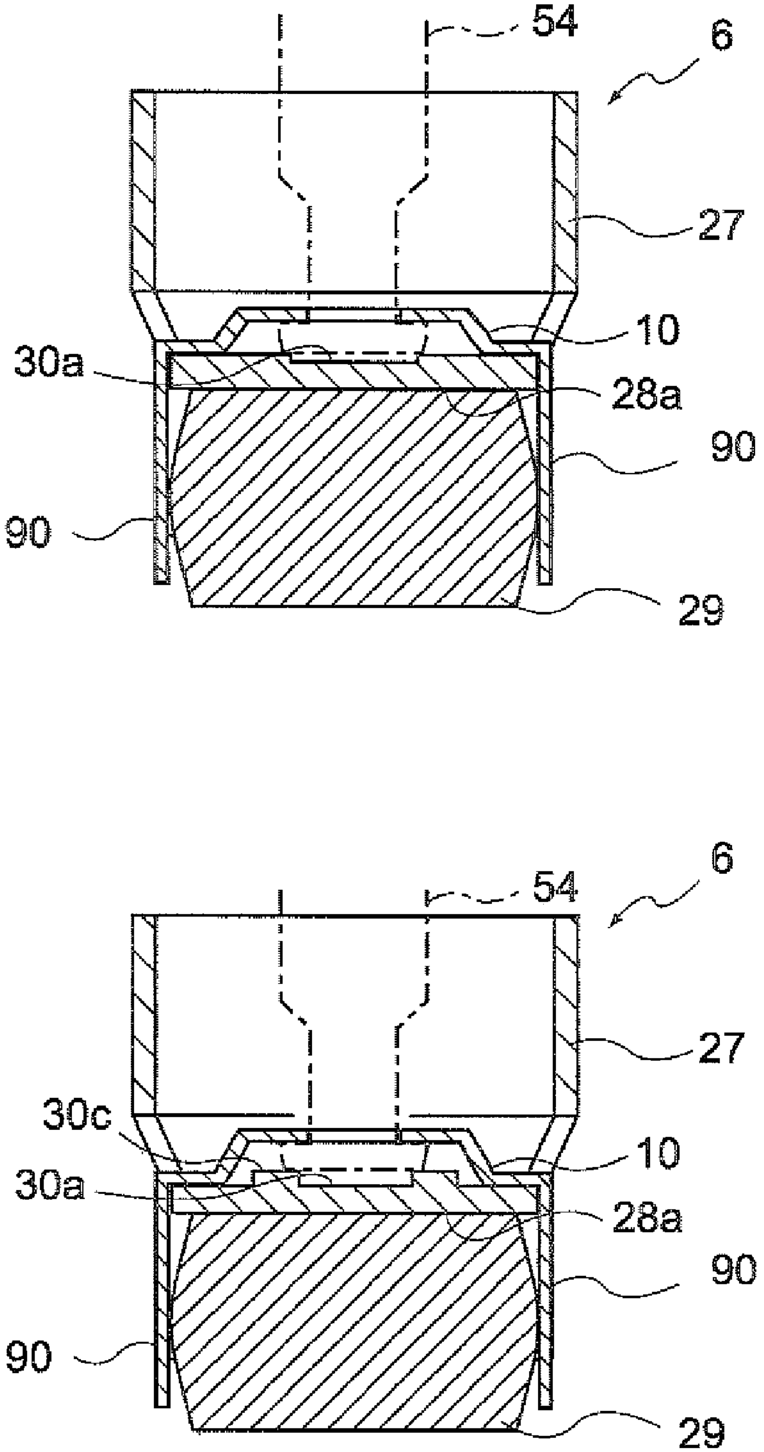

The tappet body disposed with such a concave portion can be configuring by forming a recess 30*a* in the center portion of the upper surface of the tappet body 27 as shown in FIG. 15(*a*), or the concave portion 30*a* can be formed in the center portion by forming a projecting portion 30*c* on the peripheral portion of the upper surface of the tappet body 27 as shown in FIG. 15(*b*).

In either case, when the upper surface of the tappet body and the plunger directly contact each other, the diameter of the concave portion is configured to be smaller than the diameter of the plunger distal end portion. Thus, the pressing force from the plunger can be dispersed to the peripheral portion because the plunger no longer contacts the center portion of the upper surface of the tappet body.

It will be noted that the depth of the concave portion disposed in the upper surface of the tappet body can be given conditions that are the same as those the depth of the concave portion disposed in the pressure adjusting member of the first embodiment.

Figure 16:
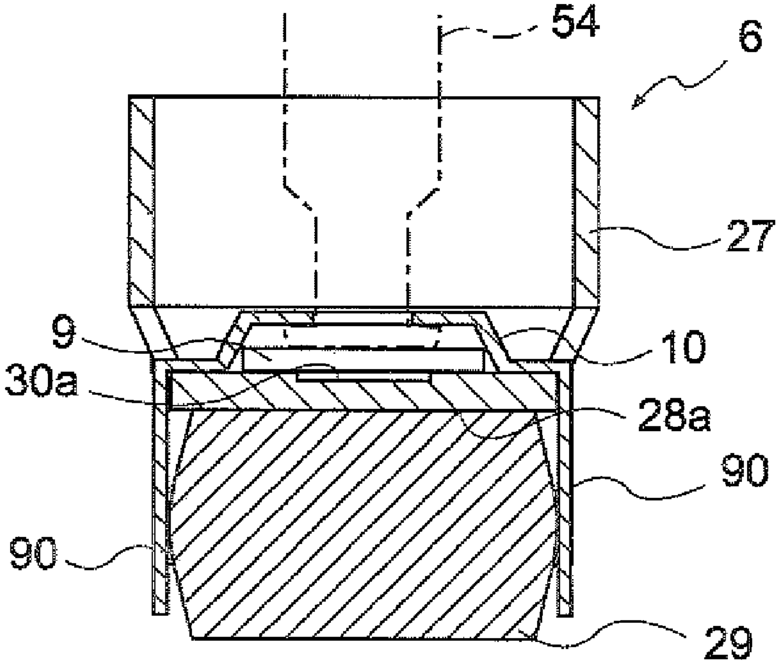
Figure 16:
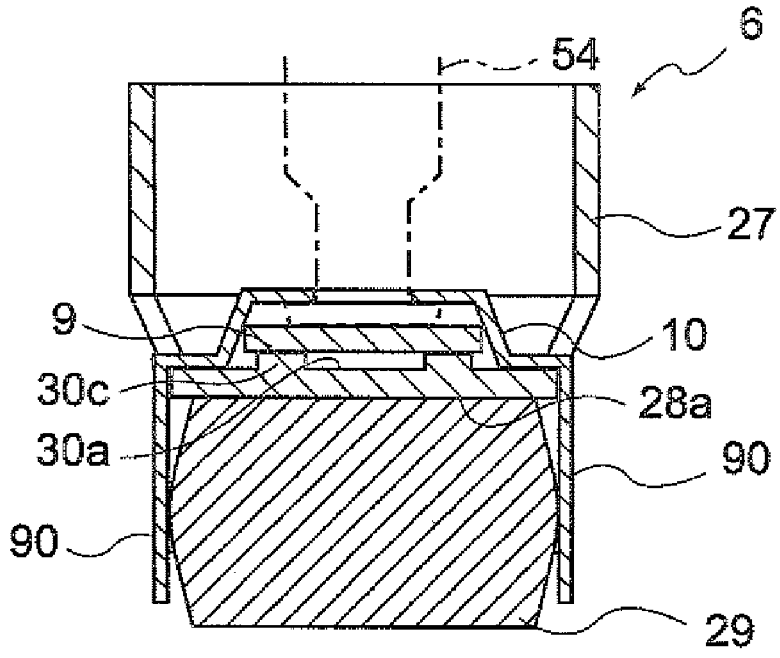
Figure 17:
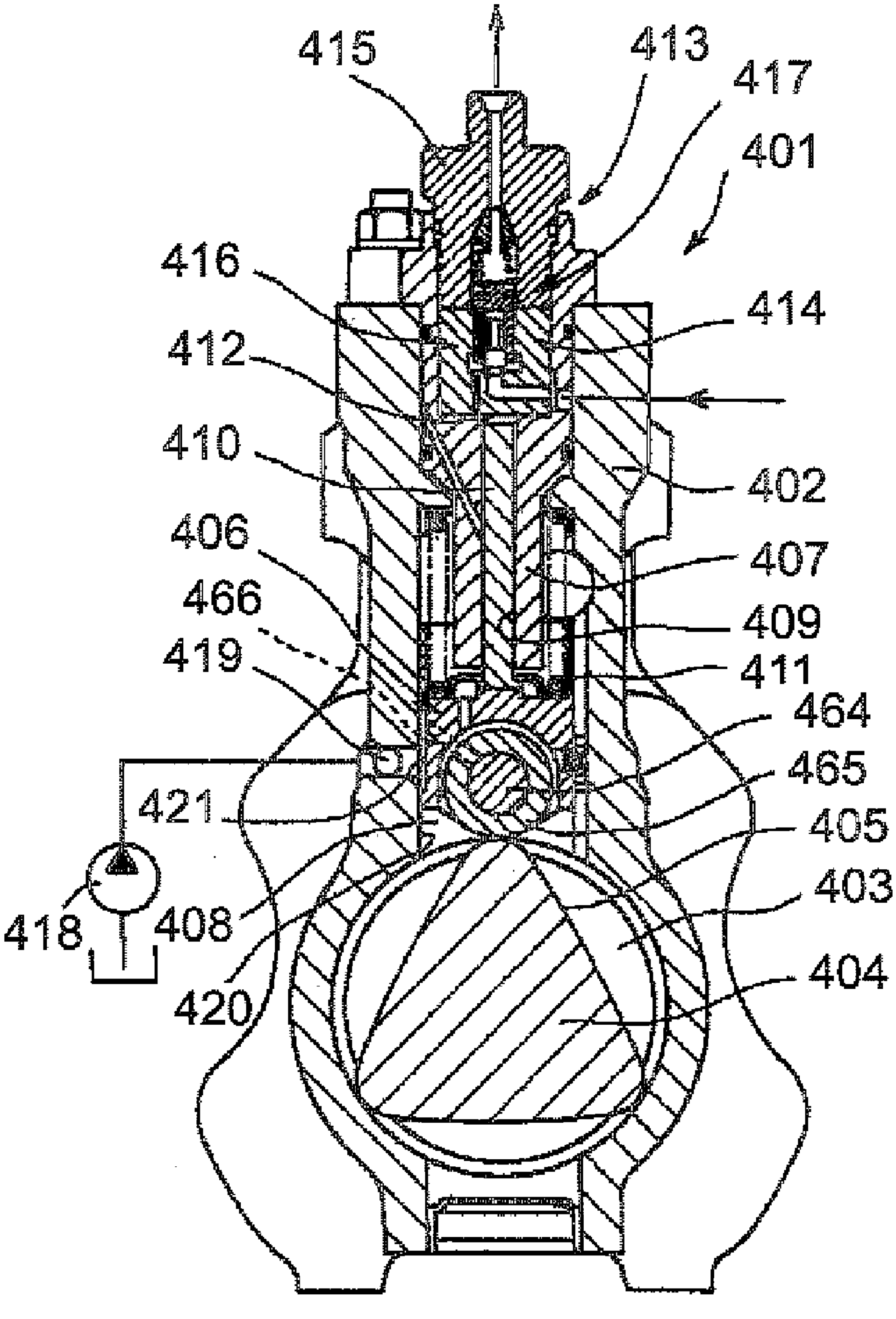
FIG. 17 is a diagram for describing a conventional tappet structure body.

Further, as shown in FIGS. 16(*a*) and (*b*), when the predetermined concave portion 30*a* is disposed in the tappet body 27, it is preferable to further dispose a mount member 9 that is placed on the tappet body 27.

The reason for this is because, when the concave portion is disposed in the tappet body, the number of parts increases but the plunger distal end portion can be received over a relatively large area, so a situation where the pressure is loaded locally and damages the distal end portion of the plunger can be prevented. Further, this is also because, by disposing the mount member, the mount member can be easily replaced when it is damaged, so maintenance of the fuel supply pump becomes easy.

It is preferable for the thickness (height) of the mount member to be, similar to the pressure adjusting member in the first embodiment, a value within the range of 5 to 10 mm from the standpoint of strength and miniaturization. Further, in regard to the method of fixing the position of the mount member, it is preferable to fix the position of the mount member by allowing the outer shape of the mount member to match the outer shape of the inner surface of the plunger attachment portion of the spring seat from the standpoint of preventing positional shifting after assembly and preventing damage and the like.

Moreover, it is preferable for the contact surface of the mount member that contacts the plunger to be a Sat surface in order to prevent damage at the contact surface between the mount member and the plunger.

Further, FIGS. 14(*a*) to (*c*) are diagrams showing the tappet structure body 6 disposed with the tappet body 27 inside of which the predetermined void 30*b* is disposed. As shown in FIG. 14(*b*), when the void 30*b* is disposed in the inside of the tappet body 27, the pressure at the center portion of the tappet body 27 can be dispersed to the peripheral edge portion by the void 30*b* disposed inside even when the pressing force of the plunger is loaded from above when the tappet structure body 6 rises or falls. Consequently, a situation where the roller 29 rolls in a state where pressure is partially loaded with respect to the sliding surface 28*a* in the roller housing portion of the tappet body 27 can be prevented and damage to the sliding surface 28*a* can be prevented.

It will be noted that the height and width of the void in the tappet body disposed with the void can be given conditions that are the same as those of the thickness (height) and diameter of the concave portion disposed in the pressure adjusting member in the first embodiment. Further, it is preferable for the contact surface of the tappet body that contacts the plunger to be a flat surface in order to prevent damage to the contact surface between the tappet body and the plunger.

According to the fuel supply pump of the present invention, by disposing the predetermined pressure adjusting member, concave portion or void in the tappet structure body, the pressing force loaded from the plunger with respect to the tappet body can be dispersed to the peripheral portion of the tappet body to prevent damage to the sliding surface of the roller housing portion. Consequently, the durability of the tappet structure body—and therefore the fuel supply pump—can be dramatically improved, and the present invention can be suitably applied particularly as a fuel supply pump in a pressure-amplifying pressure-accumulating injection device.

The foregoing relates to a preferred exemplary embodiment of the invention, it being understood that other variants and embodiments thereof are possible within the spirit and scope of the invention, the latter being defined by the appended claims.

The invention claimed is:

1. A fuel supply pump comprising:

a plunger for pressurizing fuel;

a cam disposed below the plunger;

a tappet structure disposed between the cam and the plunger for transmitting rotational force of the cam as raising force to the plunger; and a spring for applying lowering force to the plunger, wherein the tappet structure comprises a spring seat that contacts an end portion of the spring, a roller that contacts the cam, and a tappet body disposed with a roller housing portion in which the roller is housed, the roller being housed in the roller housing portion in a state where an outer peripheral surface of the roller and a sliding surface of the roller housing portion can slide, and a pressure adjusting member interposed between the tappet body and the plunger, the pressure adjusting member dispersing load force and being constructed separately from the spring seat, the plunger, and the tappet body.

2. The fuel supply pump of claim 1, wherein the pressure adjusting member comprises a concave portion in a center portion of a surface that faces the tappet body and contacts the tappet body at a peripheral portion of the concave portion.

3. The fuel supply pump of claim 1, wherein the outer shape of the pressure adjusting member is a circular flat plate shape.

4. The fuel supply pump of claim 2, wherein the outer shape of the pressure adjusting member is a circular flat plate shape.

5. The fuel supply pump of claim 1, wherein the diameter of the pressure adjusting member is larger than the diameter of a distal end portion of the plunger.

6. The fuel supply pump of claim 2, wherein the diameter of the pressure adjusting member is larger than the diameter of a distal end portion of the plunger.

7. The fuel supply pump of claim 3, wherein the diameter of the pressure adjusting member is larger than the diameter of a distal end portion of the plunger.

8. The fuel supply pump of claim 4, wherein the diameter of the pressure adjusting member is larger than the diameter of a distal end portion of the plunger.

9. The fuel supply pump of claim 2, wherein the shape of the concave portion is a circular shape having a predetermined depth, and the diameter of the concave portion is larger than the diameter of the distal end portion of the plunger.

10. The fuel supply pump of claim 4, wherein the shape of the concave portion is a circular shape having a predetermined depth, and the diameter of the concave portion is larger than the diameter of the distal end portion of the plunger.

11. The fuel supply pump of claim 1, wherein the pressure adjusting member comprises a flat contact surface that contacts the plunger.

12. The fuel supply pump of claim 1, further comprising a spring seat covering the pressure adjusting member, the spring seat fixing the position of the pressure adjusting member.

13. A fuel supply pump comprising:

a plunger for pressurizing fuel;

a cam disposed below the plunger;

a tappet structure is disposed between the cam and the plunger and is for transmitting rotational force of the cam as raising force to the plunger; and a spring for applying lowering force to the plunger, wherein the tappet structure comprises a spring seat that contacts an end portion of the spring, a roller that contacts the cam, and a tappet body disposed with a roller housing portion in which the roller is housed, the roller being housed in the roller housing portion in a state where an outer peripheral surface of the roller and a sliding surface of the roller housing portion can slide, and wherein the tappet body is disposed with a concave portion formed in a center portion of an upper surface of the tappet body in order to allow pressing force from the plunger when the tappet structure body rises or falls to be dispersed to a peripheral portion of the tappet body, and wherein a mount member which is constructed separately of the spring seat is placed on the tappet body.

14. The fuel supply pump of claim 13, wherein a contact surface of the tappet body or the mount member that contacts the plunger is a flat surface.

* * * * *